No. 794,102. PATENTED JULY 4, 1905.
C. C. HOVEY.
SEALING JAR FOR PRESERVING VARIOUS ARTICLES, SUCH AS FOOD, &c.
APPLICATION FILED OCT. 17, 1904.

Witnesses
Chas. H. Smith
Leopold Lew

Inventor
Charles C. Hovey
per Harold Terrell
Atty

No. 794,102.

Patented July 4, 1905.

UNITED STATES PATENT OFFICE.

CHARLES CORNWELL HOVEY, OF BAINBRIDGE, NEW YORK.

SEALING-JAR FOR PRESERVING VARIOUS ARTICLES, SUCH AS FOOD, &c.

SPECIFICATION forming part of Letters Patent No. 794,102, dated July 4, 1905.

Application filed October 17, 1904. Serial No. 228,676.

*To all whom it may concern:*

Be it known that I, CHARLES CORNWELL HOVEY, a citizen of the United States, residing at Bainbridge, in the county of Chenango and State of New York, have invented an Improvement in Sealing-Jars for Preserving Various Articles, such as Food, &c., of which the following is a specification.

My invention relates to the class of sealing-jars for preserving articles, and especially for preserving articles of food, in which the cover is made of sheet metal adapted to fit down into the jar to rest upon or come into proximity with the flat top walls and to seal by atmospheric pressure and through the medium of a suitable interposed gasket of flexible material after the vacuum is effected. In packing these jars the articles placed therein, and especially articles of food placed therein, are often brought so near the cover that there is very little vacuum-space, and the swelling of the articles preserved or the collection of gases given off thereby is very liable to lift the cover and destroy the seal; and the object of my invention is to overcome such difficulties.

In carrying out my invention I construct the cover with a double shell—that is to say, with outer and inner parts secured at their meeting edges or peripheries. The outer part I prefer to make as a substantially flat disk and the inner part recessed or of dishing form to fit down into the jar or vessel and when in place to rest upon the top thereof, so that there is an appreciable space between the two parts of the cover. These parts are to be soldered together at their meeting edges, and the inner part or base of the cover is provided with perforations in the bottom portion thereof, so as to connect the space in the cover with the interior of the jar. When the vacuum is effected in the jar or vessel, it is also effected within the cover, and any gases generated by the contents of the jar instead of swelling said contents can escape by the perforations into the cover-space without affecting the seal of the jar and without having any tendency to lift the cover and break the seal.

Figure 1:
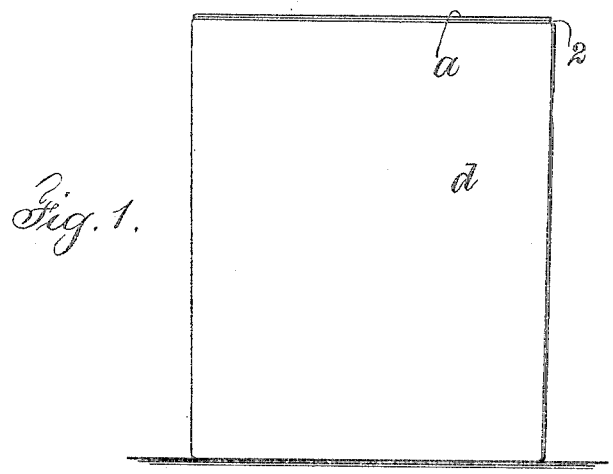
Figure 3:
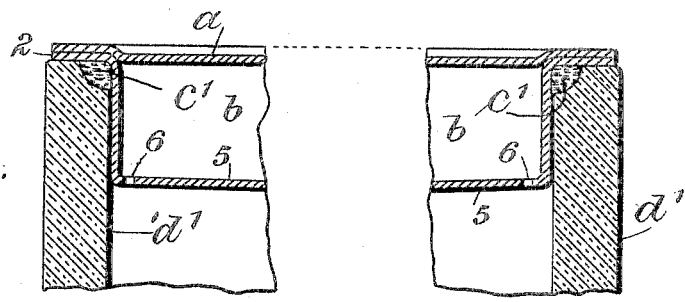
Figure 2:
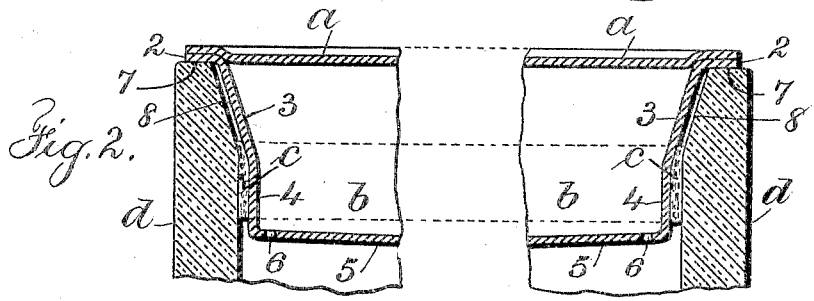
Figure 4:
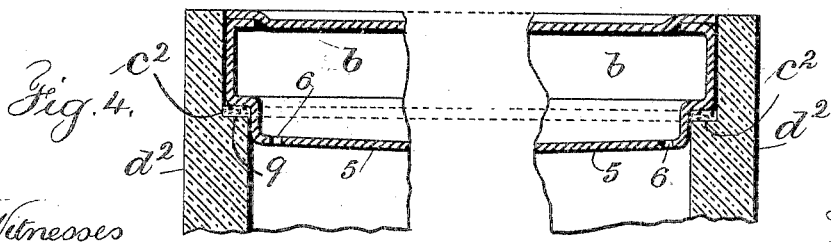

In the drawings, Figure 1 is an elevation of a jar; and Fig. 2, a broken vertical section of the same in larger size, representing the preferred form of my invention. Fig. 3 is a broken vertical section of corresponding size with Fig. 2, representing the cover of my invention as applied to the jar shown and described in Letters Patent granted to George Lees and myself as assignors of George Lees January 20, 1903, No. 718,643; and Fig. 4 is a broken vertical section representing the application of my invention to a jar of modified form.

Referring to Figs. 1 and 2, which represent the preferred form of my invention, *a* represents the substantially flat top disk of the cover, and *b* the lower dishing shell, adapted to fit down into the upper end of the jar *d*. The lower shell of the cover is provided with a flat rim 2, with inclined walls 3 at approximately seventy degrees from the horizontal, with vertical walls 4, and with a bottom portion 5, in which are made perforations 6 of any desired number and placed in any desired position, but preferably near or within the vertical walls 4. *c* represents the gasket, of flexible material, preferably rubber. The preferred form of this gasket is a flat rubber band, which in its initial emplacement surrounds the vertical walls 4 of the lower shell of the cover. The body *d* of the jar is provided with a flat top 7, with a tapering portion 8 at the upper edge on the inner side extending downward from the upper edge at an inclination of about seventy degrees from the horizontal and substantially parallel with the inclined walls 3 of the lower shell of the cover. The device of my improvement is adapted to be sealed by atmospheric pressure effected in a machine of a class well known in this art, in which the jars are placed and the air exhausted, the covers pressed down firmly to the jars and held in place, while the air is admitted to the machine to exert its force of holding the covers to place.

The gasket *c* is of suitable width and of a thickness to snugly fit the space between the juxtaposed outer surface of the walls 4 and inner surface of the body of the jar, and it is adapted as a cover, is pressed to place to shift its position and to change its location or creep, so as to completely fill the space between the jar and the walls and to fill any inequalities of the surfaces, and even to move up into the intersection between the inclined walls and the vertical walls of the cover and body of the jar, so as to effectually provide the necessary seal for the package or jar.

In filling the jar in the preferred form of my invention it matters little if the contents almost come up to the bottom plate of the lower shell, because the space in the cover between the top and bottom parts is provided to receive any gases that may be confined in or generated by the material in the jar, the top disk $a$ and lower shell $b$ of the cover being firmly soldered together around the periphery and at their contacting surfaces. Furthermore, I prefer to make the bottom 5 of the lower shell as slightly convex, thereby enabling the same to yield to a slight pressure of actual contact with the contents of the jar, any gases generated passing through the holes or perforations 6 into the space between the parts of the cover and partially or wholly filling said space, and thereby finding a resting-place where the atmospheric seal is not at all liable to be broken.

Referring to Fig. 3, the gasket $c'$ is in a short concave recess at the upper edge on the inner side of the body $d'$, and the vertical walls of the cover fit down within and parallel to the inner surface of the body $d'$ of the jar, the cover herein shown, however, being of substantially the same construction and performing the identical function of the cover shown in Fig. 2.

Referring to Fig. 4, the jar-body $d^2$ is made with a shoulder 9 to receive the gasket $c^2$, the upper end of the jar being enlarged to receive the parallel sides and fullest diameter of the cover, the lower portion or shell of the cover having an offset that provides a shoulder for seating the cover upon the gasket $c^2$. This cover, like the covers shown in Figs. 2 and 3, has a space between the top and lower parts and is provided with the perforations 6, as are the other covers. Therefore said cover is capable of performing the same functions as the covers shown in Figs. 2 and 3.

The form of jar shown in Fig. 2 and the form of the lower shell of the cover shown in the same figure agree with the subject-matter of an application of even date herewith, but do not relate to the special features of the present invention. From the foregoing it is obvious that the functions of the double cover are not in any sense modified or controlled by the external configuration of the cover or corresponding configuration of the jar, it being possible within reasonable limits to modify these features without departing from the features of my invention.

I claim as my invention—

1. The combination with a jar for holding articles to be preserved, of a cover comprising a top disk and a dishing lower shell with contacting edges united by a soldered joint, the lower shell being adapted to fit down into the jar and provided with perforations and a gasket between the jar and cover for completing the pneumatic seal.

2. In a sealing-jar for preserving articles, the combination with the body of the jar and a suitable coacting gasket, of a double cover comprising a top substantially flat disk of sheet metal and a lower dishing shell of sheet metal with a rim contacting with the surface of the top disk adjacent to the edge and secured thereto by a soldered joint, the lower shell being adapted to fit down into the body of the jar, there being a space of appreciable area between the respective parts of the cover and perforations through the bottom of the lower portion opening up communication between the space in the cover and the interior of the jar, the lower portion of the cover being received within the gasket and the same forming a pneumatic seal.

3. In a sealing-jar for preserving articles, the combination with the body of the jar and a suitable coacting gasket, of a double cover comprising a top substantially flat disk of sheet metal and a lower dishing shell of sheet metal with a rim contacting with the surface of the top disk adjacent to the edge and secured thereto by a soldered joint, the lower shell being adapted to fit down into the body of the jar and having a convex bottom portion, there being a space of appreciable area between the respective parts of the cover and perforations through the convex bottom of the lower portion opening up communication between the space in the cover and the interior of the jar, the lower portion of the cover being received within the gasket and the same forming a pneumatic seal.

4. A sealing-jar for preserving articles, comprising a body portion having a flat top, a tapering portion at the upper edge on the inner side and between the flat top and the inner walls at an inclination of about seventy degrees to the horizontal and at its ends joining with the said inner walls and flat top, and a double cover of sheet metal or similar suitable material comprising a top substantially flat disk, a lower dishing shell adapted to fit down into the jar, the said lower portion having a flat rim contacting with the under surface of the flat top adjacent to its edge and the parts connected at this place by a soldered joint, said lower portion also having inclined walls at approximately seventy degrees to a horizontal, substantially parallel with the tapering portions of the body and also having vertical walls, continuations of the inclined walls, and a perforated bottom portion and a gasket normally positioned around the vertical walls of the lower portion of the cover adapted to fill the space between the juxtaposed walls of the cover and body of the jar and the inequalities thereof in forming a perfect seal.

5. The combination with a vessel for holding articles to be preserved, of a hollow cover adapted to set upon the vessel and having a part extending below the top of the vessel, the bottom of the cover being provided with perforations to connect the space within with the interior of the vessel, and a gasket between the vessel and cover for completing the pneumatic seal.

Signed by me this 7th day of October, 1904.

CHARLES CORNWELL HOVEY.

Witnesses:
    JULIEN SCOTT,
    VERNON HOVEY.